United States Patent
Suruga et al.

(10) Patent No.: US 11,801,969 B2
(45) Date of Patent: Oct. 31, 2023

(54) PACKAGE UNIT

(71) Applicant: FUJIFILM Business Innovation Corp., Tokyo (JP)

(72) Inventors: Misaki Suruga, Kanagawa (JP); Naoto Chiba, Kanagawa (JP); Yusuke Kabe, Kanagawa (JP); Seiya Imai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 25 days.

(21) Appl. No.: 17/462,579

(22) Filed: Aug. 31, 2021

(65) Prior Publication Data

US 2022/0348378 A1 Nov. 3, 2022

(30) Foreign Application Priority Data

Apr. 30, 2021 (JP) ................. 2021-076999

(51) Int. Cl.
*B65D 19/06* (2006.01)
*B65D 19/44* (2006.01)
*B65D 65/40* (2006.01)
*B65D 85/68* (2006.01)

(52) U.S. Cl.
CPC ............ *B65D 19/06* (2013.01); *B65D 19/44* (2013.01); *B65D 65/403* (2013.01); *B65D 85/68* (2013.01); *B65D 2519/00029* (2013.01); *B65D 2519/00064* (2013.01); *B65D 2519/00159* (2013.01); *B65D 2519/00194* (2013.01); *B65D 2519/00238* (2013.01); *B65D 2519/00273* (2013.01); *B65D 2519/00815* (2013.01); *B65D 2585/6892* (2013.01)

(58) Field of Classification Search
CPC ........ B65D 19/00; B65D 19/06; B65D 19/44; B65D 65/403; B65D 85/30; B65D 85/68; B65D 85/86; B65D 2519/00029; B65D 2519/00064; B65D 2519/00159; B65D 2519/00194; B65D 2519/00238; B65D 2519/00273; B65D 2519/00815; B65D 2585/6892; B65D 19/0012; B65D 19/0026; B65D 77/04; B65D 77/0466
USPC ................................ 206/320, 386, 521, 600
See application file for complete search history.

(56) References Cited

U.S. PATENT DOCUMENTS

| | | | | |
|---|---|---|---|---|
| 3,854,579 A | * | 12/1974 | Scharre | B65D 5/5033 206/320 |
| 7,654,390 B2 | * | 2/2010 | Baechle | B65D 19/20 206/386 |
| 8,061,521 B1 | * | 11/2011 | Lowry | B65D 19/44 206/592 |

(Continued)

FOREIGN PATENT DOCUMENTS

| | | | |
|---|---|---|---|
| JP | H07-149348 A | | 6/1995 |
| JP | 2007326608 A | * | 12/2007 |

(Continued)

*Primary Examiner* — Bryon P Gehman
(74) *Attorney, Agent, or Firm* — Oliff PLC (57) ABSTRACT

A package unit includes: a base on which a packaged object is placed; a box that surrounds the packaged object; and a lid that covers the box such that a surface provided with an overlapping section where a sheet is folded and overlapped serves as a high impact resistance surface when the packaged object receives an impact.

10 Claims, 12 Drawing Sheets

(56) References Cited

U.S. PATENT DOCUMENTS

| | | | |
|---|---|---|---|
| 8,256,615 B2* | 9/2012 | Goda | B65D 19/06 |
| | | | 206/386 |
| 10,315,799 B2* | 6/2019 | Behrens | B65D 19/0012 |
| 2009/0101538 A1* | 4/2009 | Chen | B65D 5/5035 |
| | | | 206/386 |

FOREIGN PATENT DOCUMENTS

| | | |
|---|---|---|
| JP | 2012-116534 A | 6/2012 |
| JP | 2019-156478 A | 9/2019 |

* cited by examiner

PACKAGE UNIT

CROSS-REFERENCE TO RELATED APPLICATIONS

This application is based on and claims priority under 35 USC 119 from Japanese Patent Application No. 2021-076999 filed Apr. 30, 2021.

BACKGROUND

(i) Technical Field

The present disclosure relates to package units.

(ii) Related Art

Japanese Unexamined Patent Application Publication No. 7-149348 discloses a known heavy-object packaging device including a pallet, a heavy object having a storage room inside and placed on the pallet, a cardboard casing covering the heavy object, and a band that joins the casing and the pallet together. In this packaging device, the pallet and the heavy object are connected with each other by using a connection fitting, and the heavy object and the casing are secured to each other by using attachment fittings fixed to the heavy object and fastening bolts fastened to the attachment fittings. Each bolt and the casing are intervened by a washer having protrusions protruding toward the casing.

Japanese Unexamined Patent Application Publication No. 2012-116534 discloses a known packaging mode involving the use of a base and a frame-shaped anti-sideslip member that comes into contact with lateral sides of a packaged object to prevent the packaged object from sliding sideways. The base includes a base member serving as a bottom surface, multiple beam members provided on the base member and serving as beams, and a top member provided on the beam members and serving as a top surface. The base is configured such that the beam members are partially exposed from the edges of the top member. The lower end of the anti-sideslip member is placed only on the beam members exposed from the edges of the top member.

SUMMARY

Aspects of non-limiting embodiments of the present disclosure relate to suppression of an impact applied to a packaged object when being transported.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a package unit including: a base on which a packaged object is placed; a box that surrounds the packaged object; and a lid that covers the box such that a surface provided with an overlapping section where a sheet is folded and overlapped serves as a high impact resistance surface when the packaged object receives an impact.

BRIEF DESCRIPTION OF THE DRAWINGS

Exemplary embodiments of the present disclosure will be described in detail based on the following figures, wherein.

DETAILED DESCRIPTION

Although exemplary embodiments and specific examples of the present disclosure will be described in detail below with reference to the drawings, the present disclosure is not to be limited to these exemplary embodiments and specific examples.

Furthermore, in the following description with reference to the drawings, it should be noted that the drawings are schematic and that the dimensional scales may be different from those in reality. For a simpler illustration, components other than those used for the description are omitted from the drawings, where appropriate.

First Exemplary Embodiment

1. Configuration of Package Unit

Figure 1:
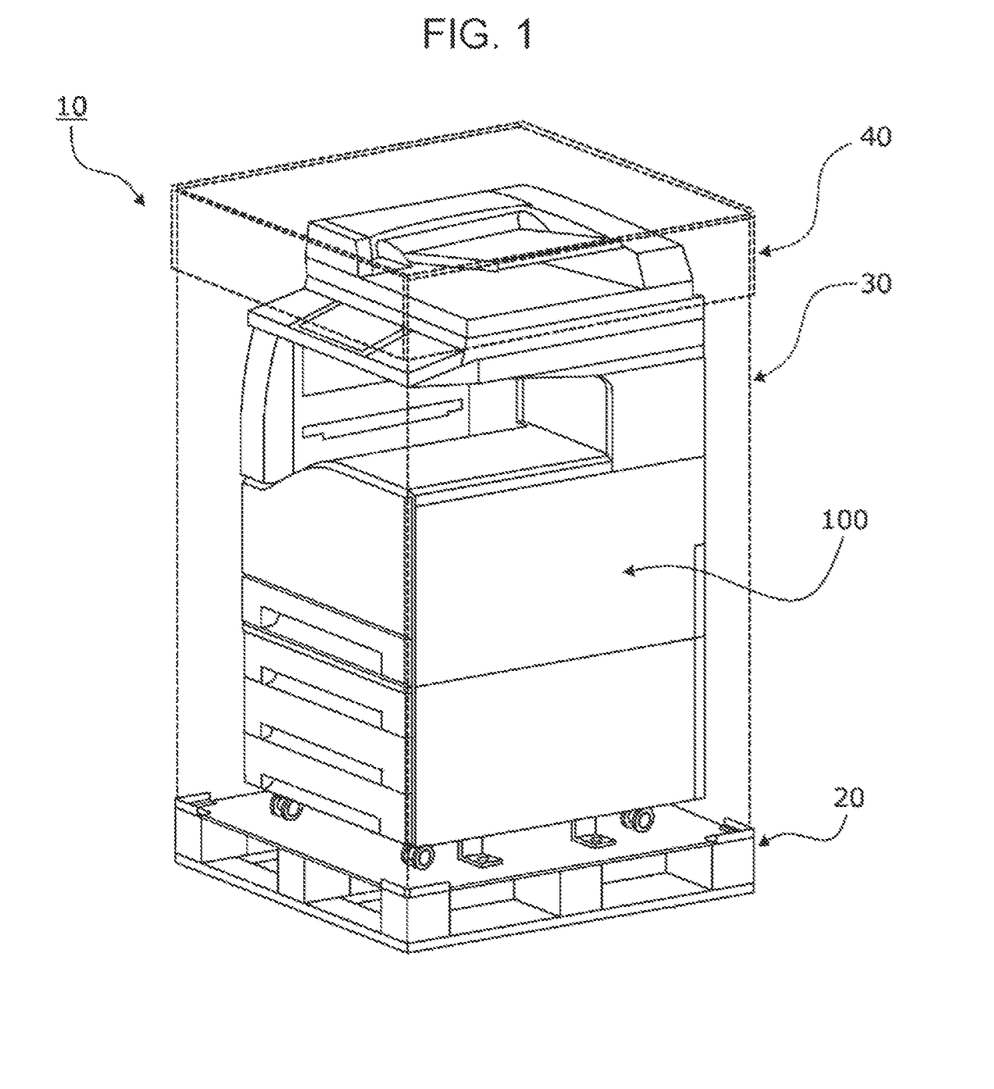
FIG. 1 is an overall perspective view schematically illustrating a packaging mode using a package unit according to a first exemplary embodiment.
Figure 2:
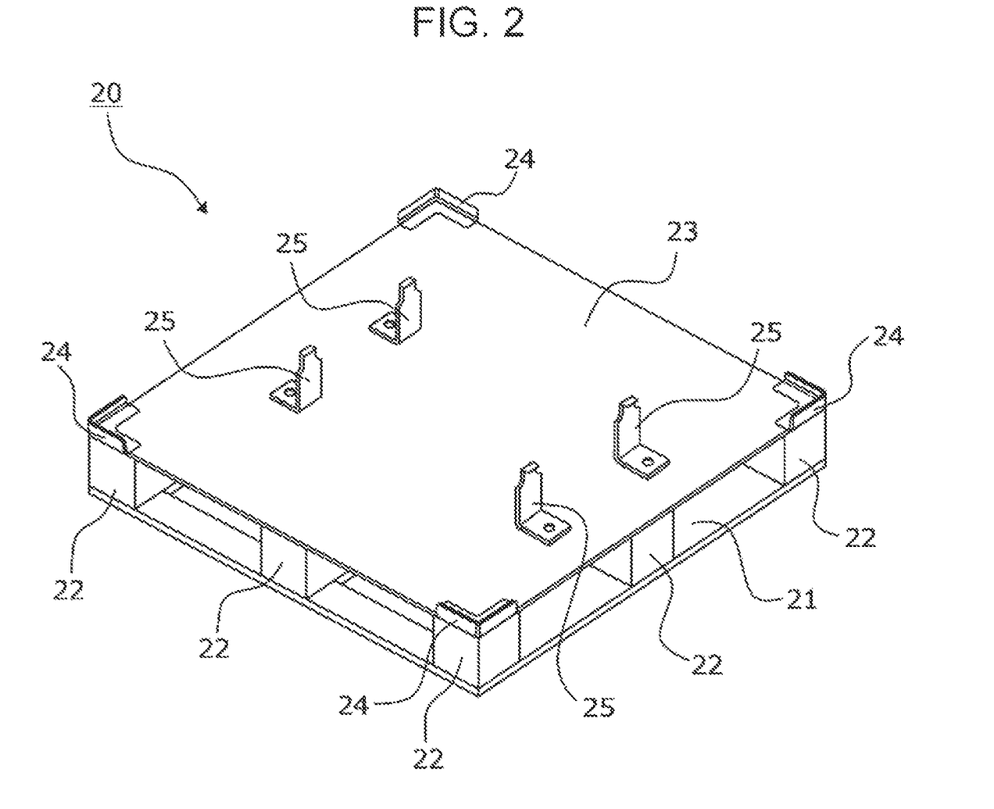
FIG. 2 is a perspective view schematically illustrating a pallet of the package unit according to the first exemplary embodiment.
Figure 3:
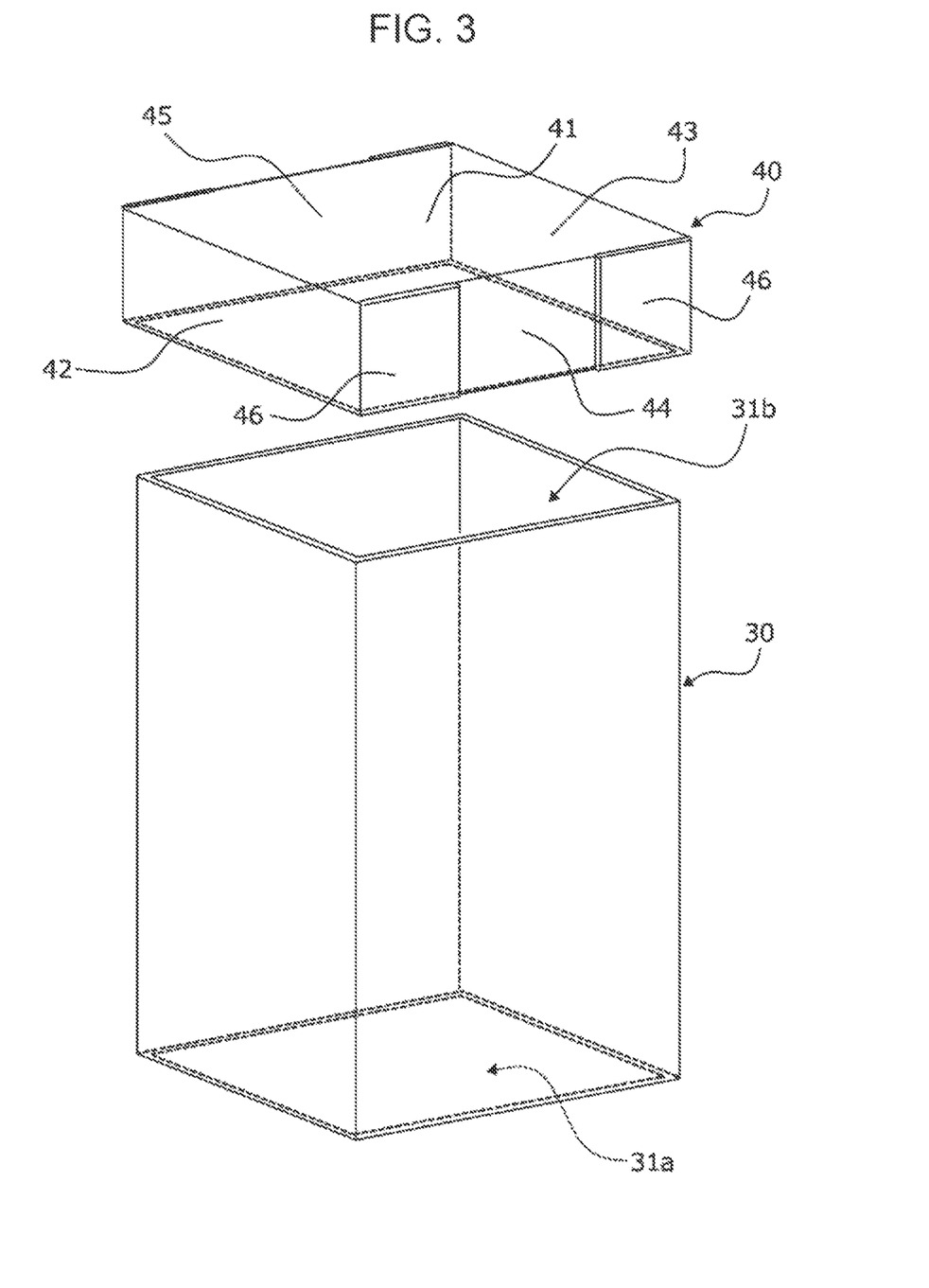
FIG. 3 is a perspective view illustrating a box and a lid in a separated state.

FIG. 1 is an overall perspective view schematically illustrating a packaging mode using a package unit 10 according to a first exemplary embodiment. FIG. 2 is a perspective view schematically illustrating a pallet 20 of the package unit 10 according to this exemplary embodiment. FIG. 3 is a perspective view illustrating a box 30 and a lid 40 in a separated state. The overall configuration and the packaging mode of the package unit 10 will be described below with reference to the drawings.

The package unit 10 includes the pallet 20, the box 30, and the lid 40. As shown in FIG. 1, in a state where a packaged object 100 is placed on the pallet 20 while being prevented from moving sideways by stopper members 25, the packaged object 100 is packaged by being covered with the box 30 and the lid 40. In order to show the packaged object 100 in FIG. 1, the box 30 and the lid 40 covering the packaged object 100 are indicated with dashed lines.

The pallet 20 according to this exemplary embodiment is an example of a base. For example, as shown in FIG. 2, the pallet 20 includes a wooden base member 21 serving as a bottom surface, wooden beam members 22 including multiple stringer beams and cross beams provided on the base member 21, and a wooden top member 23 provided on the beam members 22 and serving as a top surface.

The four corners of the top member 23 are individually provided with positioning members 24 for positioning the lower end of the box 30. Moreover, the stopper members 25 for preventing the packaged object 100 placed on the top member 23 from moving sideways are disposed on the top member 23.

The beam members 22 are intervened by spaces extending along the beam members 22 and into which a fork of a cargo-handling machine, such as a forklift, is insertable.

The box 30 is a rectangular tube in plan view and is formed of a cardboard sheet. The lower end and the upper end of the box 30 are open. In a state where the packaged object 100 is placed on the pallet 20, the box 30 is fitted around the packaged object 100 from a lower opening 31a and is positioned on the top member 23 of the pallet 20 by using the positioning members 24.

The lid 40 covers an upper opening 31b of the box 30 fitted around the packaged object 100, and is formed of a cardboard sheet.

2. Packaging Mode of Packaged Object

Figure 4A:
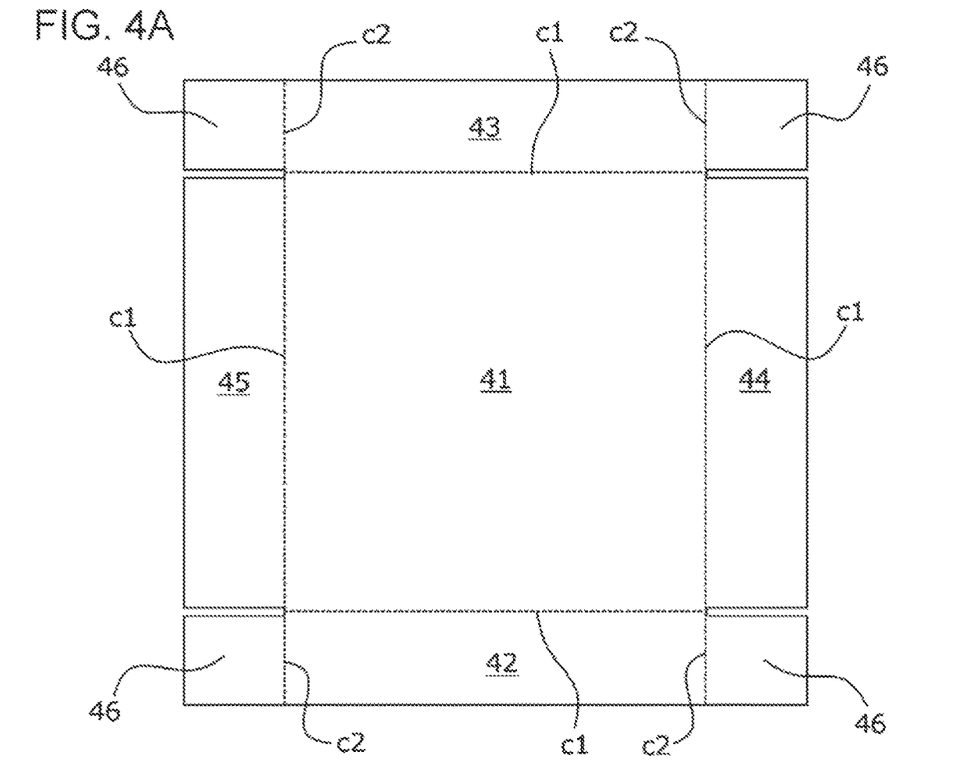
FIG. 4A is a development view of the lid.
Figure 4B:
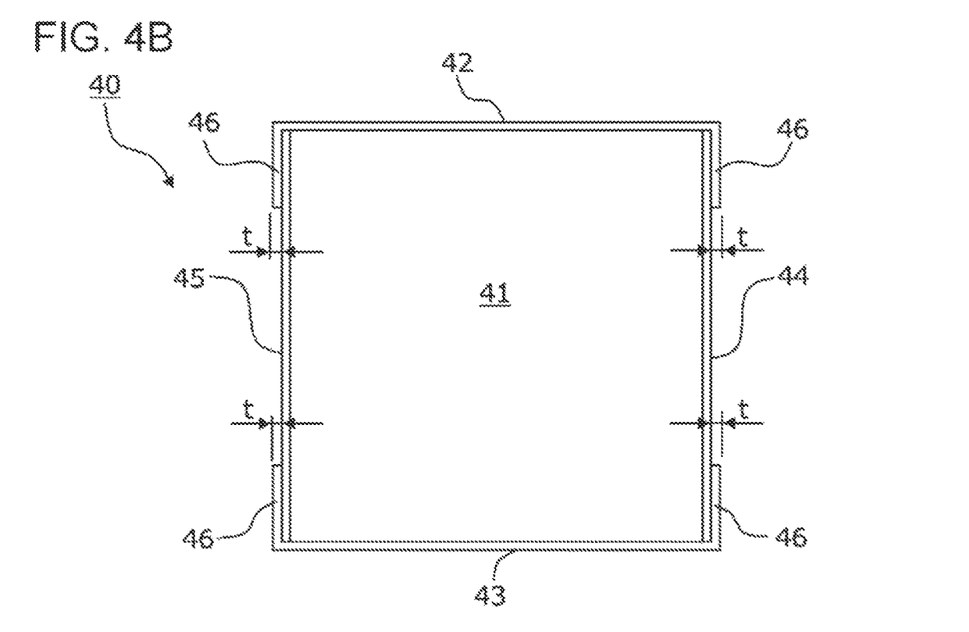
FIG. 4B is a bottom view illustrating the configuration of the lid.
Figure 5A:
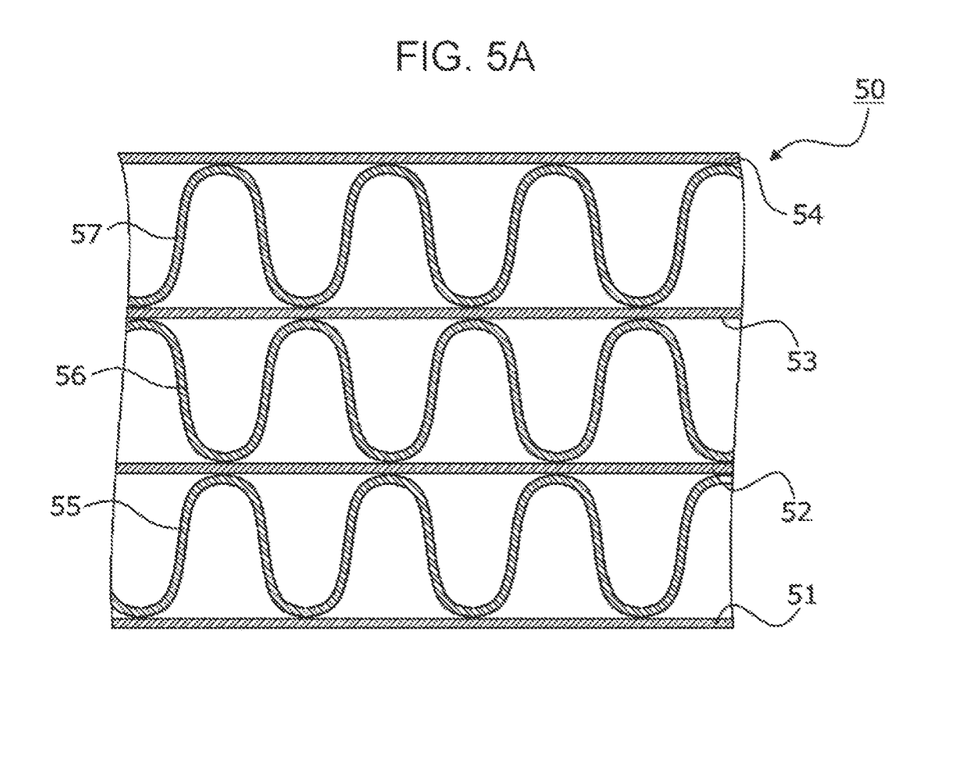
FIG. 5A is a partially expanded cross-sectional view illustrating the configuration of a cardboard sheet used as the box.
Figure 5B:
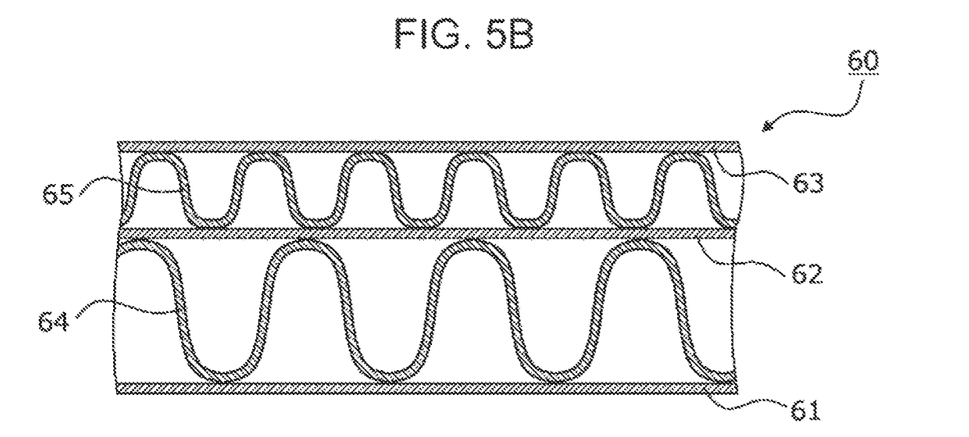
FIG. 5B is a partially expanded cross-sectional view illustrating the configuration of a cardboard sheet used as the lid.
Figure 6A:
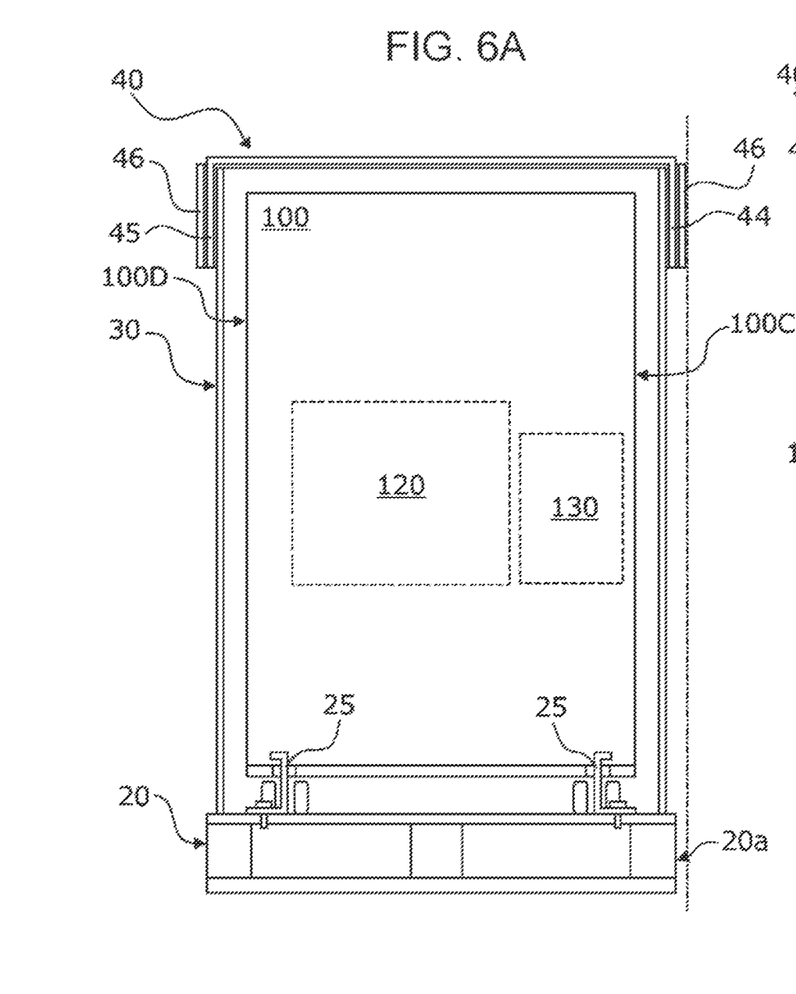
FIGS. 6A and 6B are vertical sectional views schematically illustrating an example of the packaging mode of a packaged object.
Figure 6B:
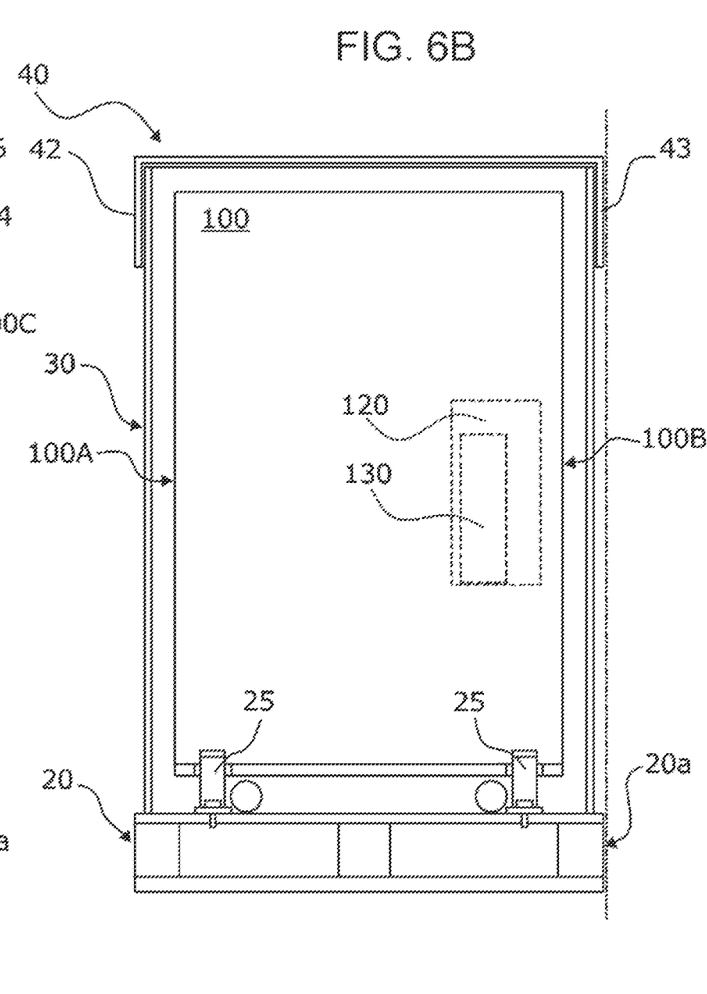
Figure 7A:
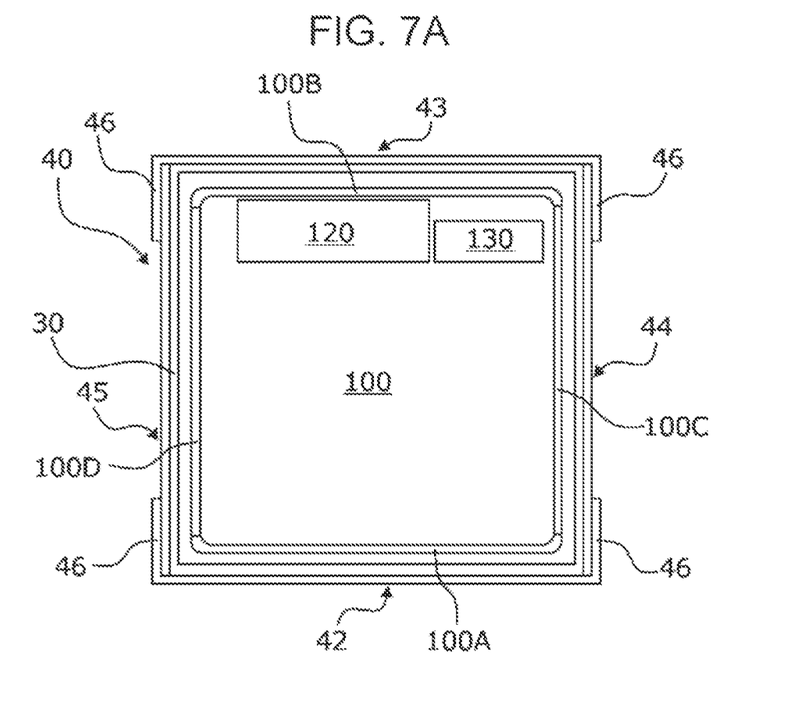
FIGS. 7A and 7B are plan views schematically illustrating an example of the packaging mode of the packaged object.
Figure 7B:
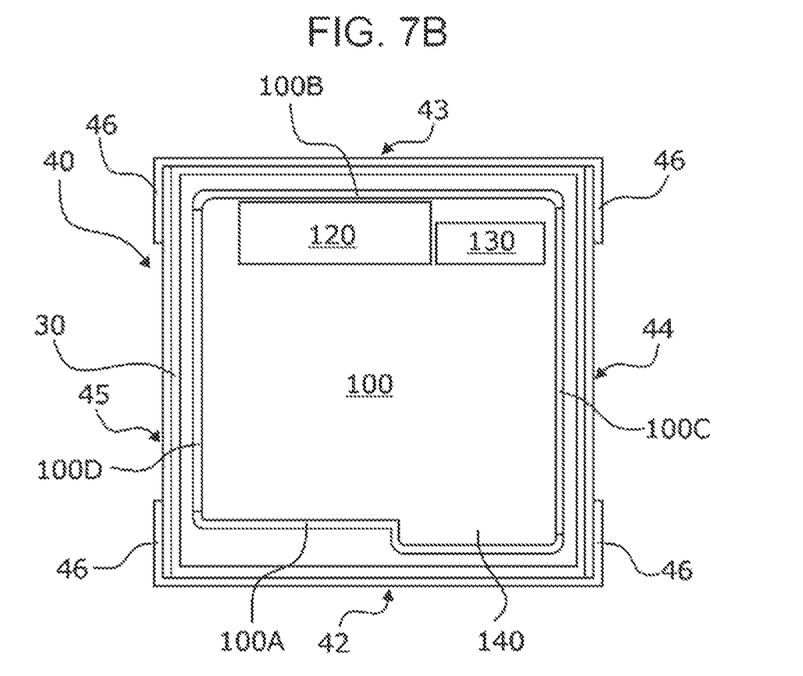

FIG. 4A is a development view of the lid 40, FIG. 4B is a bottom view illustrating the configuration of the lid 40, FIG. 5A is a partially expanded cross-sectional view illustrating the configuration of a cardboard sheet 50 used as the box 30, FIG. 5B is a partially expanded cross-sectional view illustrating the configuration of a cardboard sheet 60 used as the lid 40, FIGS. 6A and 6B are vertical sectional views schematically illustrating an example of the packaging mode of the packaged object 100, and FIGS. 7A and 7B are plan views schematically illustrating an example of the packaging mode of the packaged object 100.

2.1. Configuration of Package Unit

As shown in the development view in FIG. 4A, the lid 40 according to this exemplary embodiment has a top lid section 41 covering the upper opening 31b of the box 30, a first sidewall section 42, a second sidewall section 43, a third sidewall section 44, and a fourth sidewall section 45 that are to be folded along folding lines c1 to serve as side surfaces, and overlapping sections 46 that are connected with the first sidewall section 42 and the second sidewall section 43 and that are to be folded along folding lines c2 to overlap with the third sidewall section 44 and the fourth sidewall section 45.

With regard to the lid 40 shown in the development view, the first sidewall section 42, the second sidewall section 43, the third sidewall section 44, and the fourth sidewall section 45 are folded along the folding lines c1 relative to the top lid section 41, and the overlapping sections 46 are folded along the folding lines c2 and are joined to the third sidewall section 44 and the fourth sidewall section 45, as shown in FIG. 4B, whereby a lid that covers the upper opening 31b of the box 30 is formed.

As shown in FIG. 4B, with regard to the lid 40 formed as a result of joining the overlapping sections 46 to the third sidewall section 44 and the fourth sidewall section 45, the first sidewall section 42 and the second sidewall section 43 are outward-facing flat surfaces, whereas the third sidewall section 44 and the fourth sidewall section 45 joined to the overlapping sections 46 are stepped surfaces from which the overlapping sections 46 protrude outward (indicated with reference sign "t" in FIG. 4B).

Each of the box 30 and the lid 40 according to this exemplary embodiment is formed of a cardboard sheet.

As shown in FIG. 5A, the box 30 is formed of three-layer reinforced cardboard having a planar first liner sheet 51, a planar second liner sheet 52, a planar third liner sheet 53, a planar fourth liner sheet 54, a corrugated flute 55 interposed between the first liner sheet 51 and the second liner sheet 52, a corrugated flute 56 interposed between the second liner sheet 52 and the third liner sheet 53, and a corrugated flute 57 interposed between the third liner sheet 53 and the fourth liner sheet 54. Such three-layer reinforced cardboard has a thickness of, for example, about 15 mm and is suitable for packaging a heavy object with a weight ranging from 30 kg to about 1500 kg.

As shown in FIG. 5B, the lid 40 is formed of two-layer reinforced cardboard having a planar first liner sheet 61, a planar second liner sheet 62, a planar third liner sheet 63, a corrugated first flute 64 interposed between the first liner sheet 61 and the second liner sheet 62, and a corrugated second flute 65 interposed between the second liner sheet 62 and the third liner sheet 63. Such two-layer reinforced cardboard has a thickness of, for example, about 10 mm. The lid 40 is formed of a softer cardboard sheet than the box 30.

2.2. Packaging Mode of Packaged Object

The packaged object 100 according to this exemplary embodiment is, for example, an electronic device having a power source 120 and an electronic substrate 130 disposed therein. As schematically shown in FIGS. 7A and 7B, the electronic device is covered with a front cover 100A, a rear cover 100B, a right cover 100C, and a left cover 100D.

In the electronic device, the power source 120 and the electronic substrate 130 are safety priority components that are greatly affected in terms of safety when damaged due to an impact, and are normally disposed at the rear cover 100B side of the device. As schematically shown in FIG. 7B, an operation display unit 140 is sometimes disposed at the front cover 100A side of the device. On the other hand, the right cover 100C and the left cover 100D of the device are wide flat surfaces with no electrical components, such as the power source 120 and the electronic substrate 130, disposed adjacent thereto, and serve as high impact resistance surfaces.

As shown in FIGS. 6A and 6B, in the package unit 10 according to this exemplary embodiment, the packaged object 100 is covered with the box 30 in a state where the packaged object 100 is placed on the pallet 20 and is prevented from moving sideways by the stopper members 25, and the lid 40 covers the box 30 such that the third sidewall section 44 and the fourth sidewall section 45 provided with the overlapping sections 46 respectively cover the right cover 100C and the left cover 100D functioning as high impact resistance surfaces when the packaged object 100 receives an impact.

In detail, as shown in FIG. 6A and FIGS. 7A and 7B, the right cover 100C and the left cover 100D of the packaged object 100 are respectively covered with the third sidewall section 44 and the fourth sidewall section 45. As shown in FIG. 6B and FIGS. 7A and 7B, the front cover 100A and the rear cover 100B of the packaged object 100 are respectively covered with the first sidewall section 42 and the second sidewall section 43. As mentioned above, the third sidewall section 44 and the fourth sidewall section 45 are provided with the overlapping sections 46, whereas the first sidewall section 42 and the second sidewall section 43 are not provided with overlapping sections and thus do not have steps formed as a result of overlapping. The first sidewall section 42 and the second sidewall section 43 and end surfaces 20a of the pallet 20 are flush with each other, that is, are disposed at the same height relative to horizontal movement of the package unit 10.

Because the package unit 10 according to this exemplary embodiment is provided with the pallet 20 at the base, the package unit 10 is transportable by using a forklift. For example, in a warehouse during the distribution stage, the package unit 10 is transported while being maintained in a horizontal state by using the forklift, and is aligned and stacked by being brought into abutment with a wall surface. In this case, any one of the end surfaces 20a of the pallet 20 and any one of the side surfaces of the lid 40 covering the box 30 may receive an impact in the horizontal direction, possibly causing the packaged object 100 to partially receive a large impact.

2.3. Impact Absorption of Package Unit

Figure 8A:
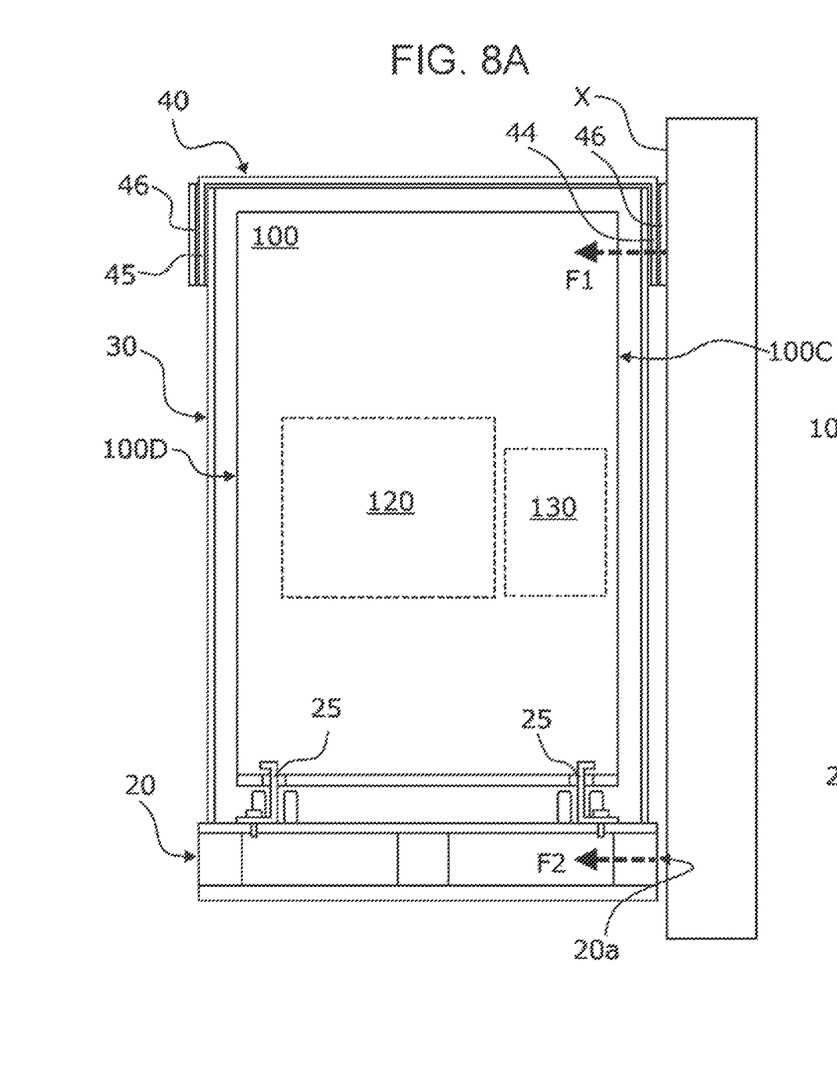
FIGS. 8A and 8B are vertical sectional views schematically illustrating how the package unit having the packaged object packaged therein absorbs an impact when the package unit collides with a wall and receives an impact in the horizontal direction, FIG. 8A illustrating a case where a right cover of the packaged object collides with a wall surface, FIG. 8B illustrating a case where a rear cover of the packaged object collides with the wall surface.
Figure 8B:
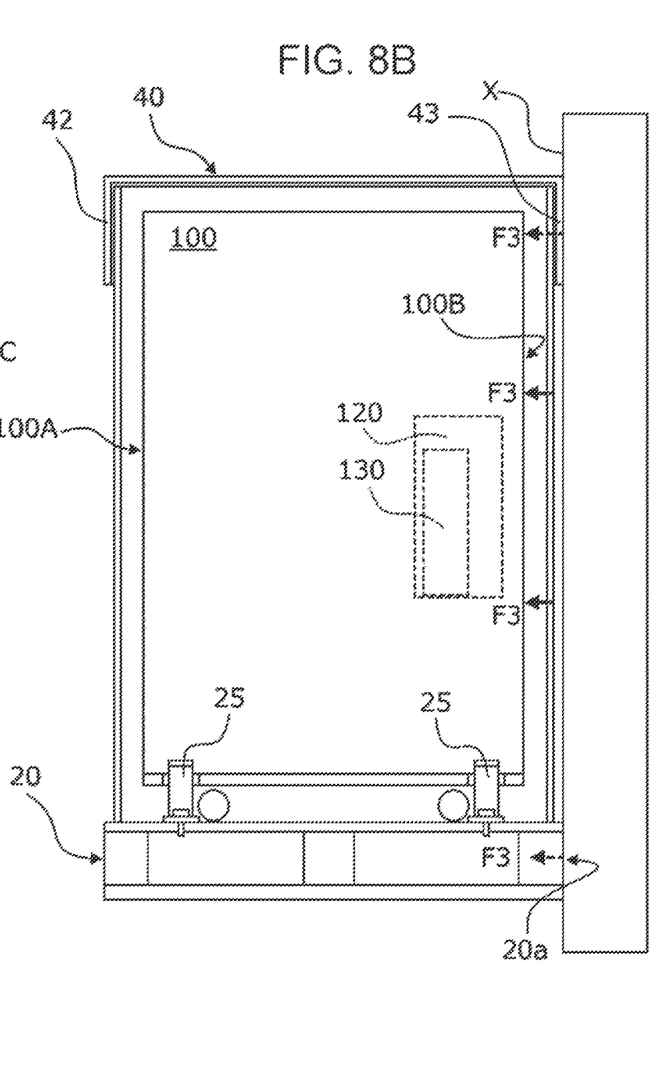

FIGS. 8A and 8B are vertical sectional views schematically illustrating how the package unit 10 having the packaged object 100 packaged therein absorbs an impact when the package unit 10 collides with a wall and receives an impact in the horizontal direction. Specifically, FIG. 8A illustrates a case where the right cover 100C of the packaged object 100 collides with a wall surface X, and FIG. 8B illustrates a case where the rear cover 100B of the packaged object 100 collides with the wall surface X.

In a case where the right cover 100C or the left cover 100D of the packaged object 100 collides with the wall surface X, the third sidewall section 44 of the lid 40 first comes into contact with the wall surface X and deforms in the thickness direction since the third sidewall section 44 provided with the overlapping section 46 of the lid 40 protrudes outward the most, as shown in FIG. 8A. Until the end surface 20a of the pallet 20 comes into contact with the wall surface X, the third sidewall section 44 of the lid 40 and the box 30 absorb the impact (see an arrow F1 in FIG. 8A).

Subsequently, the end surface 20a of the pallet 20 comes into contact with the wall surface X so that the pallet 20 absorbs the impact (see an arrow F2 in FIG. 8A). Because the lid 40 is readily deformable due to being formed of a softer material, such as two-layer reinforced cardboard, than the box 30, the lid 40 absorbs the impact to a certain degree. Then, the right cover 100C serving as a relatively high impact resistance surface becomes the collision surface, so that the packaged object 100 is less likely to receive the effect of the impact.

In a case where the front cover 100A or the rear cover 100B of the packaged object 100 collides with the wall surface X, the second sidewall section 43 of the lid 40 and the end surface 20a of the pallet 20 come into contact with the wall surface X substantially at the same time since the first sidewall section 42 or the second sidewall section 43 not provided with the overlapping section 46 of the lid 40 is flush with the end surface 20a of the pallet 20, as shown in FIG. 8B, so that the impact received by the lid 40 and the box 30 is distributed (see arrows F3 in FIG. 8B). In this case, because the lid 40 is readily deformable due to being formed of soft two-layer reinforced cardboard, as compared with the box 30, the lid 40 absorbs the impact to a certain degree. The impact is distributed so that the packaged object 100 is less likely to receive the effect of the impact even if the collision surface has relatively low impact resistance.

Second Exemplary Embodiment

Figure 9A:
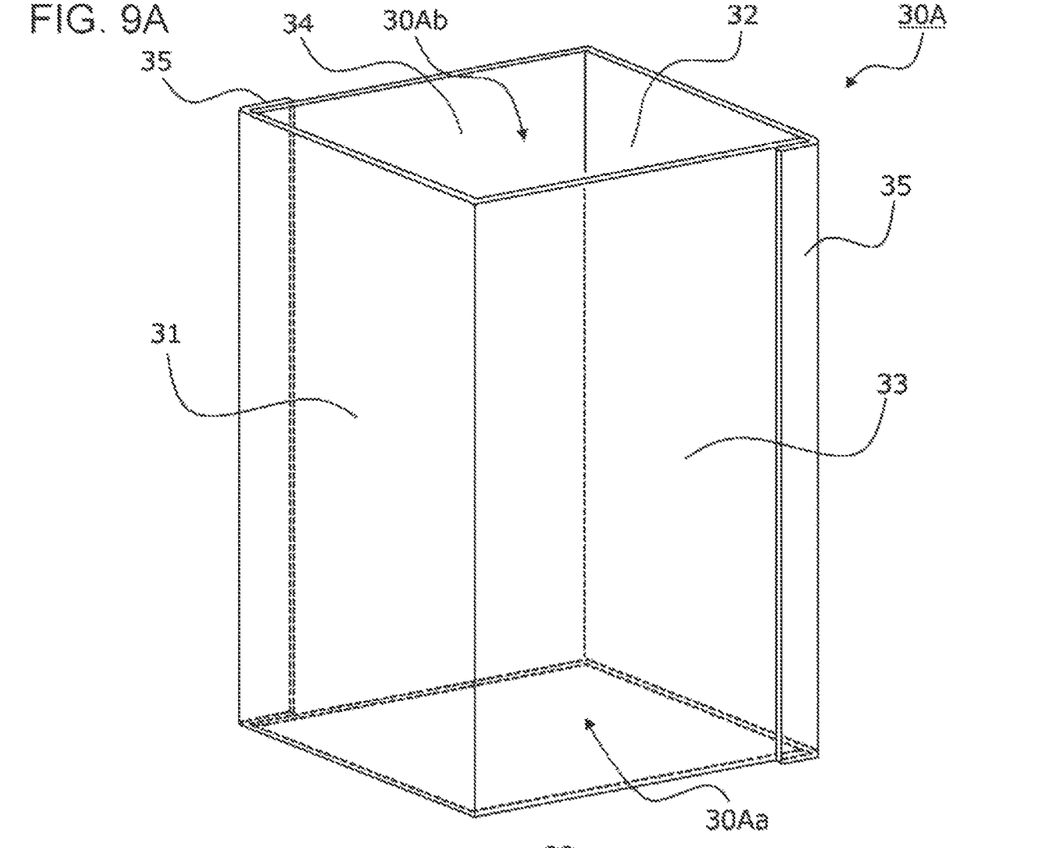
FIG. 9A is a perspective view illustrating a box of a package unit according to a second exemplary embodiment.
Figure 9B:
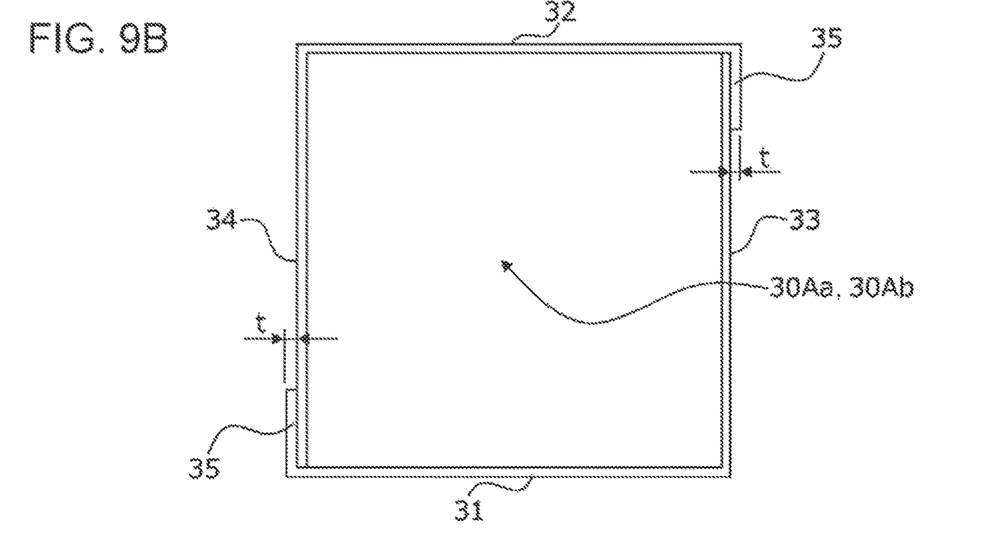
FIG. 9B is a plan view of the box.

FIG. 9A is a perspective view illustrating a box 30A of a package unit 10A according to a second exemplary embodiment, and FIG. 9B is a plan view of the box 30A. The package unit 10A according to this exemplary embodiment includes the pallet 20 and the box 30A, and is different from the package unit 10 according to the first exemplary embodiment in that the package unit 10A is not provided with a lid that covers an upper opening 30Ab of the box 30A. Therefore, components identical to those in the first exemplary embodiment will be given the same reference signs, and detailed descriptions thereof will be omitted.

1. Configuration of Package Unit

The box 30A is a rectangular tube in plan view and is formed of a cardboard sheet. The lower end and the upper end of the box 30A are open. In a state where the packaged object 100 is placed on the pallet 20, the box 30A is fitted around the packaged object 100 from a lower opening 30Aa and is positioned on the top member 23 of the pallet 20 by using the positioning members 24.

As shown in FIGS. 9A and 9B, the box 30A has a first sidewall section 31, a second sidewall section 32, a third sidewall section 33, and a fourth sidewall section 34, and is formed as a tube by joining the first sidewall section 31 and the fourth sidewall section 34 together and the second sidewall section 32 and the third sidewall section 33 together at overlapping sections 35.

As shown in FIG. 9B, with regard to the box 30A formed by joining the sidewall sections together at the overlapping sections 35, the first sidewall section 31 and the second sidewall section 32 are outward-facing flat surfaces, whereas the third sidewall section 33 and the fourth sidewall section 34 joined to the overlapping sections 35 are stepped surfaces from which the overlapping sections 35 protrude outward (indicated with reference sign "t" in FIG. 9B).

The box 30A according to this exemplary embodiment is similar to the box 30 according to the first exemplary embodiment in that the box 30A is formed of three-layer reinforced cardboard, has a thickness of, for example, about 15 mm, and is suitable for packaging a heavy object with a weight ranging from 30 kg to about 1500 kg.

2. Packaging Mode of Packaged Object

Figure 10A:
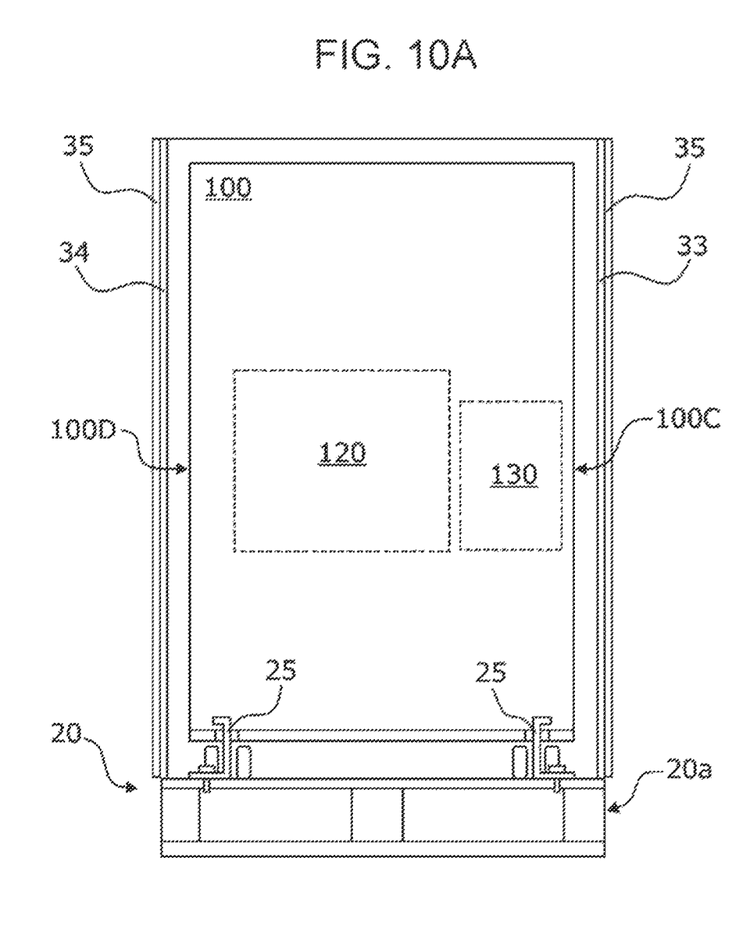
FIGS. 10A and 10B are vertical sectional views schematically illustrating an example of the packaging mode of the packaged object.
Figure 10B:
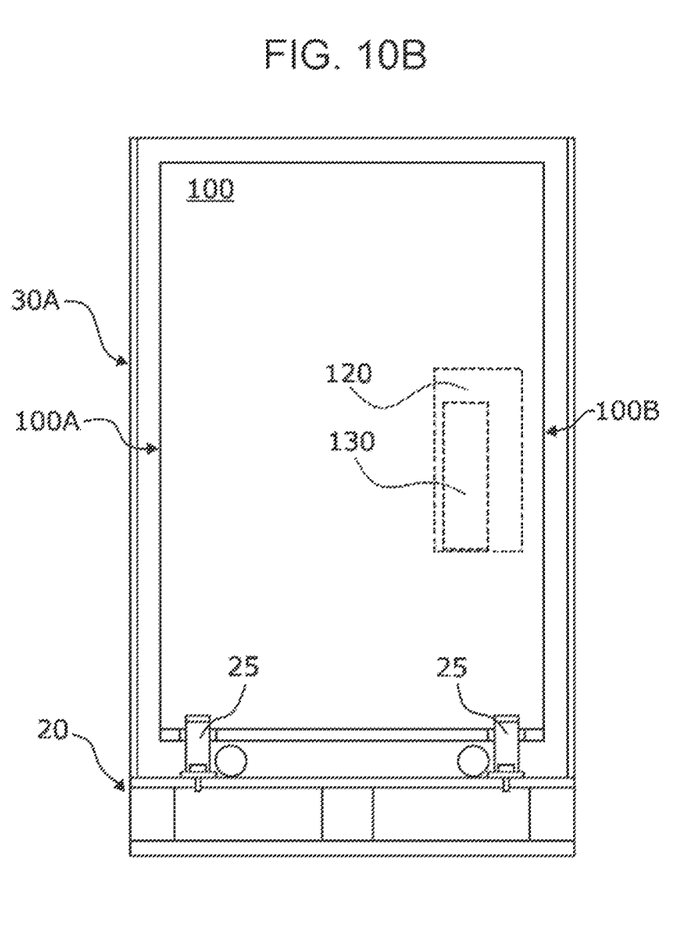
Figure 11A:
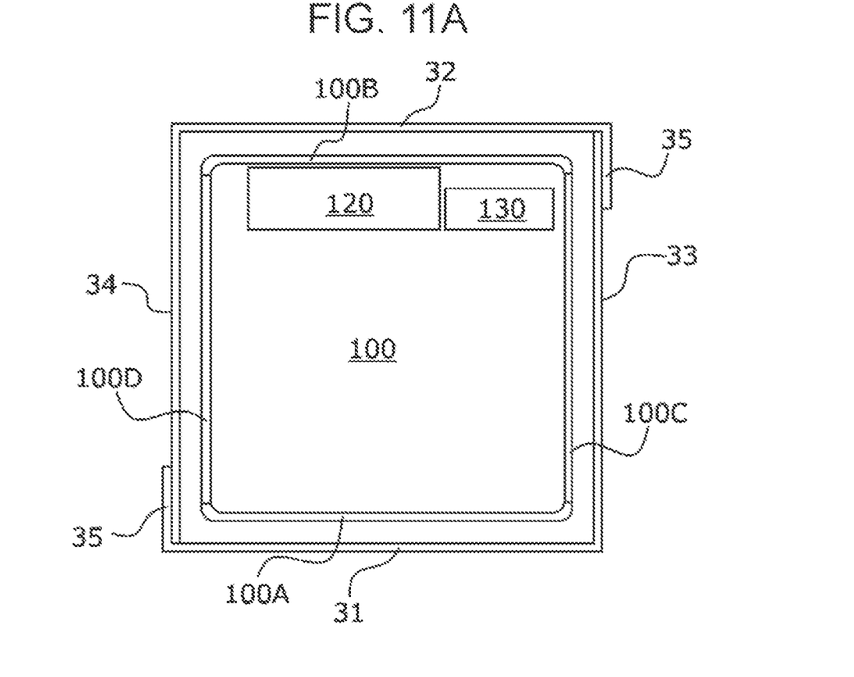
FIGS. 11A and 11B are plan views schematically illustrating an example of the packaging mode of the packaged object.
Figure 11B:
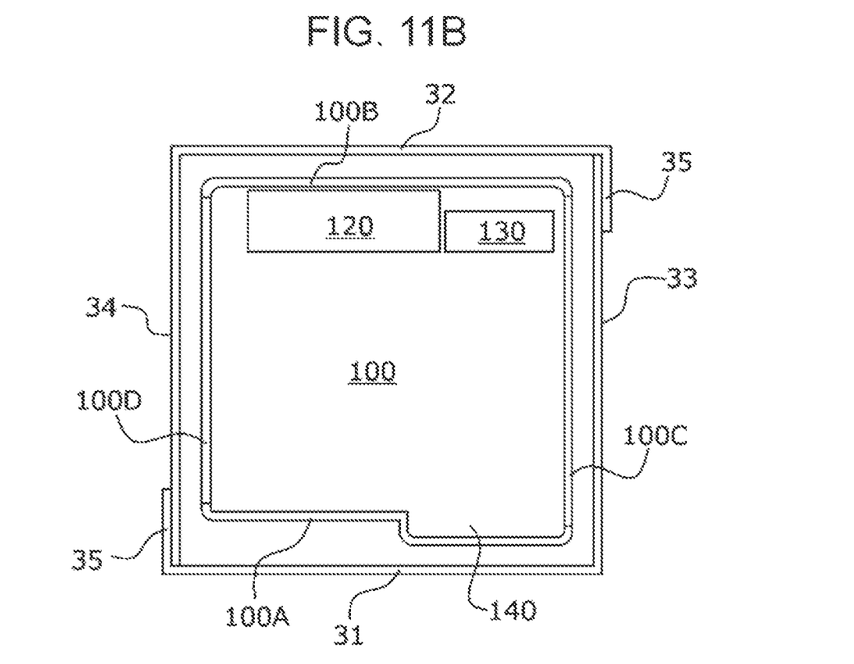

FIGS. 10A and 10B are vertical sectional views schematically illustrating an example of the packaging mode of the packaged object 100, and FIGS. 11A and 11B are plan views schematically illustrating an example of the packaging mode of the packaged object 100.

The packaged object 100 according to this exemplary embodiment is similar to the electronic device described in the first exemplary embodiment in having the power source 120 and the electronic substrate 130 disposed therein. As schematically shown in FIGS. 11A and 11B, the electronic device is covered with the front cover 100A, the rear cover 100B, the right cover 100C, and the left cover 100D. As schematically shown in FIG. 11B, the operation display unit 140 is sometimes disposed at the front cover 100A side of the device. The right cover 100C and the left cover 100D of the device are wide flat surfaces with no electronic components, such as the power source 120 and the electronic substrate 130, disposed adjacent thereto, and serve as high impact resistance surfaces.

As shown in FIGS. 10A and 10B, in the package unit 10A according to this exemplary embodiment, the packaged object 100 is placed on the pallet 20 and is prevented from moving sideways by the stopper members 25. In this state, the box 30A covers the packaged object 100 such that the third sidewall section 33 and the fourth sidewall section 34 provided with the overlapping sections 35 respectively cover the right cover 100C and the left cover 100D functioning as high impact resistance surfaces when the packaged object 100 receives an impact.

In detail, as shown in FIG. 10A and FIGS. 11A and 11B, the right cover 100C and the left cover 100D of the packaged object 100 are respectively covered with the third sidewall section 33 and the fourth sidewall section 34. As shown in FIG. 10B and FIGS. 11A and 11B, the front cover 100A and the rear cover 100B of the packaged object 100 are respectively covered with the first sidewall section 31 and the second sidewall section 32. As mentioned above, the third sidewall section 33 and the fourth sidewall section 34 are provided with the overlapping sections 35, whereas the first sidewall section 31 and the second sidewall section 32 are not provided with overlapping sections and thus do not have steps formed as a result of overlapping. The first sidewall section 31 and the second sidewall section 32 and the end surfaces 20a of the pallet 20 are disposed at the same height relative to horizontal movement of the package unit 10A.

3. Impact Absorption of Package Unit

Figure 12A:
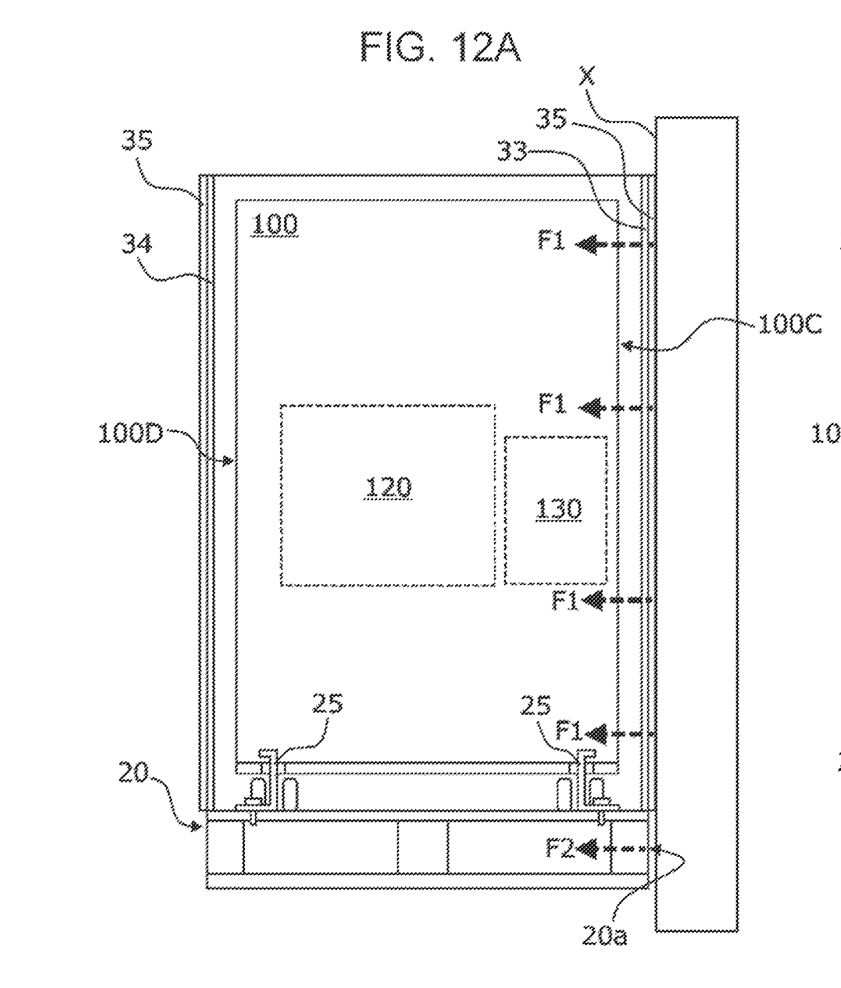
FIGS. 12A and 12B are vertical sectional views schematically illustrating how the package unit having the packaged object packaged therein absorbs an impact when the package unit collides with a wall and receives an impact in the horizontal direction, FIG. 12A illustrating a case where the right cover of the packaged object collides with the wall surface, FIG. 12B illustrating a case where the rear cover of the packaged object collides with the wall surface.
Figure 12B:
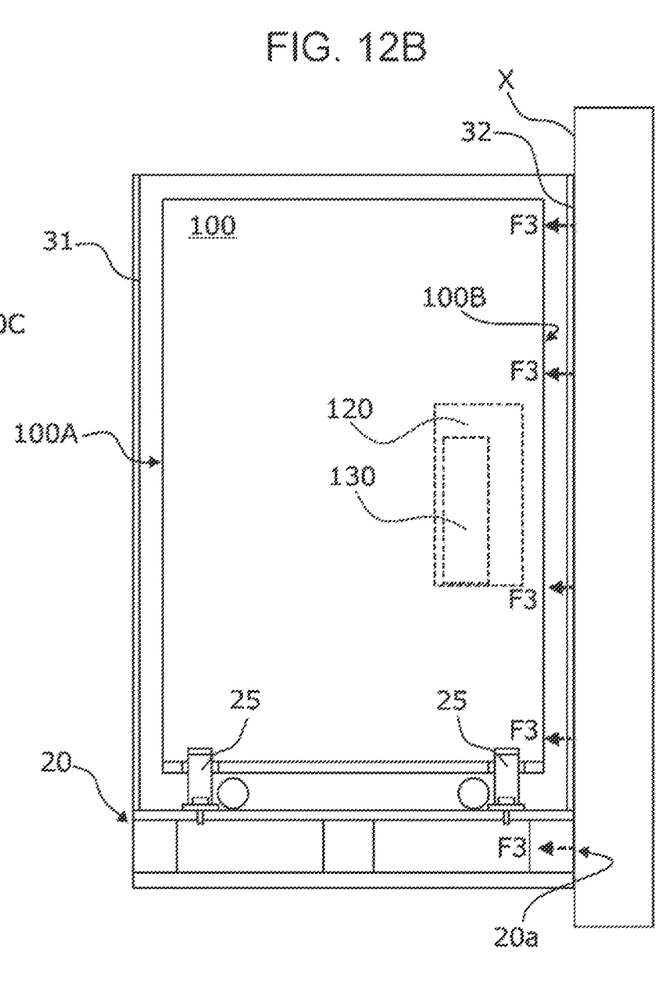

FIGS. 12A and 12B are vertical sectional views schematically illustrating how the package unit 10A having the packaged object 100 packaged therein absorbs an impact when the package unit 10A collides with a wall and receives an impact in the horizontal direction. Specifically, FIG. 12A illustrates a case where the right cover 100C of the packaged object 100 collides with the wall surface X, and FIG. 12B illustrates a case where the rear cover 100B of the packaged object 100 collides with the wall surface X.

In a case where the right cover 100C or the left cover 100D of the packaged object 100 collides with the wall surface X, the corresponding overlapping section 35 of the box 30A first comes into contact with the wall surface X and deforms in the thickness direction since the third sidewall section 33 provided with the relevant overlapping section 35 of the box 30A protrudes outward the most, as shown in FIG. 12A. Until the end surface 20a of the pallet 20 comes into contact with the wall surface X, the overlapping section 35 of the box 30A and the third sidewall section 33 absorb the impact (see arrows F1 in FIG. 12A). Subsequently, the end surface 20a of the pallet 20 comes into contact with the wall surface X so that the pallet 20 absorbs the impact (see an arrow F2 in FIG. 12A). Then, the right cover 100C serving as a relatively high impact resistance surface becomes the collision surface, so that the packaged object 100 is less likely to receive the effect of the impact.

In a case where the front cover 100A or the rear cover 100B of the packaged object 100 collides with the wall surface X, the second sidewall section 32 of the box 30A and the end surface 20a of the pallet 20 come into contact with the wall surface X substantially at the same time since the first sidewall section 31 or the second sidewall section 32 not provided with the overlapping section 35 of the box 30A is flush with the end surface 20a of the pallet 20, as shown in FIG. 12B, so that the impact received by the box 30A is distributed (see arrows F3 in FIG. 12B). The impact is distributed so that the packaged object 100 is less likely to receive the effect of the impact even if the collision surface has relatively low impact resistance.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A package unit comprising:
a base on which a packaged object is placed;
a box that surrounds the packaged object; and
a lid that covers the box, the lid comprising a surface with an overlapping section where a sheet is folded and overlapped to serve as a high impact resistance surface when the packaged object receives an impact, wherein
the lid and the box are each constituted of a cardboard sheet having a liner and a flute layered in a thickness direction, and
the cardboard sheet constituting the lid has a smaller number of layers than the cardboard sheet included in the box.

2. The package unit according to claim 1,
wherein a surface not provided with the overlapping section of the lid and an end surface of the base are flush with each other.

3. The package unit according to claim 2,
wherein the lid is formed of a softer material than the box.

4. The package unit according to claim 3,
wherein an electrical component that causes the packaged object to operate is not disposed at the high impact resistance surface of the packaged object.

5. The package unit according to claim 4,
wherein the high impact resistance surface of the packaged object is flat as compared with another surface.

6. The package unit according to claim 2,
wherein an electrical component that causes the packaged object to operate is not disposed at the high impact resistance surface of the packaged object.

7. The package unit according to claim 6,
wherein the high impact resistance surface of the packaged object is flat as compared with another surface.

8. The package unit according to claim 1,
wherein the lid is formed of a softer material than the box.

9. The package unit according to claim 1,
wherein an electrical component that causes the packaged object to operate is not disposed at the high impact resistance surface of the packaged object.

10. The package unit according to claim 9,
wherein the high impact resistance surface of the packaged object is flat as compared with another surface.

* * * * *